(12) United States Patent
Bai et al.

(10) Patent No.: US 8,765,628 B2
(45) Date of Patent: *Jul. 1, 2014

(54) POISON RESISTANT CATALYST SYSTEMS AND ASSOCIATED PROCESSES

(75) Inventors: Chuansheng Bai, Phillipsburg, NJ (US); Adrienne J. Thornburg, Allentown, PA (US); Heather A. Elsen, Bethlehem, PA (US); William G. Borghard, Haddon Heights, NJ (US); Cody R. Cole, Easton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/942,325

(22) Filed: Nov. 9, 2010

(65) Prior Publication Data

US 2012/0115713 A1    May 10, 2012

(51) Int. Cl.

| | |
|---|---|
| *B01J 20/28* | (2006.01) |
| *B01J 35/00* | (2006.01) |
| *B01J 37/34* | (2006.01) |
| *B01J 21/02* | (2006.01) |
| *B01J 23/00* | (2006.01) |
| *B01J 23/10* | (2006.01) |
| *B32B 15/04* | (2006.01) |
| *B32B 9/00* | (2006.01) |
| *B32B 19/00* | (2006.01) |

(52) U.S. Cl.
USPC ............ 502/204; 502/4; 502/5; 502/202; 502/300; 502/303; 502/304; 502/305; 502/325; 428/457; 428/469; 428/472; 428/689

(58) Field of Classification Search
USPC ......... 502/4, 5, 202, 204, 300, 303–305, 325; 428/457, 469, 472, 689
See application file for complete search history.

(56) References Cited

U.S. PATENT DOCUMENTS

| | | |
|---|---|---|
| 2,881,131 A | 4/1959 | Kearby |
| 3,736,265 A | 5/1973 | Suggitt |
| 3,758,614 A | 9/1973 | Mertzweiller et al. |
| 4,025,606 A | 5/1977 | Acres |
| 4,040,410 A | 8/1977 | Libowitz |
| 4,120,763 A | 10/1978 | Breda et al. |

(Continued)

FOREIGN PATENT DOCUMENTS

| | | |
|---|---|---|
| EP | 1708297 A1 | 10/2006 |
| EP | 1946837 A2 * | 7/2008 |

OTHER PUBLICATIONS

Nicholas E. Leadbeater, Rashid M. Khan, "Microwave-Promoted Desulfurization of Heavy and Sulfur-Containing Crude Oil," Energy & Fuels (2008), 22(3), 1836-1839 Abstract.

(Continued)

*Primary Examiner* — Patricia L Hailey
(74) *Attorney, Agent, or Firm* — Bruce M. Bordelon; Chad A. Guice (57) ABSTRACT

Exemplary embodiments of the present invention relate to the processing of hydrocarbon-containing feedstreams in the presence of an active catalyst component comprising a surface, and a metal oxide film coated on the surface of the active catalyst component. The catalysts and processes of the present invention can improve overall hydrogenation, product conversion, as well as improved resistance to catalytic deactivation due to sulfur and nitrogen compounds present in the hydrocarbon feedstreams.

11 Claims, 7 Drawing Sheets

(56) References Cited

U.S. PATENT DOCUMENTS

| | | | |
|---|---|---|---|
| RE30,083 E | 8/1979 | Reilly et al. | |
| 4,279,722 A | 7/1981 | Kirkbride | |
| 4,302,436 A | 11/1981 | Sirovich et al. | |
| 4,492,769 A * | 1/1985 | Blanchard et al. | 502/262 |
| 4,545,879 A | 10/1985 | Wan et al. | |
| 4,556,551 A | 12/1985 | Wallace et al. | |
| 4,560,816 A | 12/1985 | Davis, Jr. | |
| 5,229,345 A * | 7/1993 | Logothetis et al. | 502/242 |
| 5,286,698 A | 2/1994 | Carberry et al. | |
| 5,332,705 A | 7/1994 | Huang et al. | |
| 5,525,435 A | 6/1996 | Pourarian | |
| 5,695,530 A | 12/1997 | Hong et al. | |
| 5,759,939 A * | 6/1998 | Klabunde et al. | 502/328 |
| 6,017,845 A | 1/2000 | Ovalles et al. | |
| 6,040,087 A * | 3/2000 | Kawakami | 429/218.1 |
| 6,165,643 A * | 12/2000 | Doyle et al. | 429/218.2 |
| 6,171,479 B1 | 1/2001 | Ovalles et al. | |
| 6,403,523 B1 | 6/2002 | Cantrell et al. | |
| 6,670,490 B1 | 12/2003 | Campos et al. | |
| 6,680,042 B1 | 1/2004 | Schulz et al. | |
| 7,157,401 B2 * | 1/2007 | Purta et al. | 502/180 |
| 7,341,977 B2 * | 3/2008 | Klabunde et al. | 502/400 |
| 7,387,712 B2 * | 6/2008 | Purta et al. | 204/157.15 |
| 7,455,927 B2 | 11/2008 | DiSalvo, Jr. et al. | |
| 7,566,393 B2 * | 7/2009 | Klabunde et al. | 208/208 R |
| 7,601,329 B2 | 10/2009 | Vajo et al. | |
| 7,700,069 B2 | 4/2010 | Stephens | |
| 2002/0013221 A1 | 1/2002 | Thompson et al. | |
| 2002/0177735 A1 | 11/2002 | Kanamori et al. | |
| 2003/0073571 A1 | 4/2003 | Heijden et al. | |
| 2004/0074759 A1 | 4/2004 | Purta et al. | |
| 2004/0074760 A1 | 4/2004 | Portnoff et al. | |
| 2004/0077485 A1 | 4/2004 | Purta et al. | |
| 2005/0202965 A1 | 9/2005 | Cavalcanti et al. | |
| 2005/0274065 A1 | 12/2005 | Portnoff et al. | |
| 2006/0096893 A1 | 5/2006 | De Almeida et al. | |
| 2007/0087933 A1 | 4/2007 | Purta et al. | |
| 2007/0202335 A1 | 8/2007 | Kubota | |
| 2008/0233020 A1 | 9/2008 | Purta et al. | |
| 2008/0262114 A1 | 10/2008 | Reynhout | |
| 2008/0302703 A1 * | 12/2008 | Purta et al. | 208/143 |
| 2011/0119990 A1 * | 5/2011 | Venkataraman et al. | 44/307 |
| 2011/0119992 A1 * | 5/2011 | Pourarian et al. | 44/307 |
| 2012/0111768 A1 * | 5/2012 | Elsen | 208/112 |

OTHER PUBLICATIONS

L. K. Heung, G. G. Wicks, "Silica embedded metal hydrides," Journal of Alloys and Compounds 293-295 (1999) pp. 446-451.

Visintin, A. et al., "Electrochemical activation and electrocatalytic enhancement of a hyride-forming metal alloy modified with palladium, platinum and nickel", Electrochimica Acta, 2006, pp. 3658-3667, vol. 51.

* cited by examiner

POISON RESISTANT CATALYST SYSTEMS AND ASSOCIATED PROCESSES

FIELD OF THE INVENTION

The present invention relates to catalysts for the processing of hydrocarbon feedstreams. The catalysts include an active catalyst component having a surface, and a metal oxide film selectively coated onto the surface of the active catalyst component. The resulting catalysts are particularly improved in their resistance to nitrogen-containing poisons in hydrocarbon feedstreams. The processes of the present invention utilizing these catalysts are beneficial for producing improved upgraded product conversion, particularly wherein sulfur-containing and/or nitrogen-containing organic compounds, which may poison typical catalyst components, are present in the hydrocarbon feedstreams.

INTRODUCTION

As the demand for hydrocarbon-based fuels has risen, the need for improved processes for desulfurizing hydrocarbon feedstreams has increased, as well as the need for increasing the conversion of the heavy portions of these feedstreams into more valuable, lighter fuel products. These hydrocarbon feedstreams include, but are not limited to, whole and reduced petroleum crudes, shale oils, coal liquids, atmospheric and vacuum residua, asphaltenes, deasphalted oils, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, raffinates, biofuels, and mixtures thereof.

Hydrocarbon streams boiling above 430° F. (220° C.) often contain considerable amounts of large multi-ring hydrocarbon molecules and/or conglomerated associations of large molecules containing a large portion of the sulfur, nitrogen and metals present in the hydrocarbon stream. A significant portion of the sulfur contained in these heavy oils is in the form of heteroatoms in polycyclic aromatic molecules, such as dibenzothiophenes, from which the sulfur is difficult to remove.

The high molecular weight, large multi-ring aromatic hydrocarbon molecules or associated heteroatom-containing (e.g., S, N, O) multi-ring hydrocarbon molecules in heavy oils are generally found in a solubility class of molecules termed as asphaltenes. A significant portion of the sulfur is contained within the structure of these asphaltenes or lower molecular weight polar molecules termed as "polars" or "resins". Due to the large aromatic structures of the asphaltenes, the sulfur can be refractory in nature and can be difficult to remove. In conventional refining processes, sulfur compounds are removed in refinement processes from various hydrocarbon streams by "cracking" the petroleum oils in the presence of a metal catalyst and hydrogen. These conventional refining processes for sulfur removal from hydrocarbon streams are known by such names as "hydrodesulfurization" processes or "hydrocracking" processes, and are well known in the industry.

In these processes, the sulfur atoms in the hydrocarbon streams are exposed or separated from the oil and are able to react with hydrogen which is then liberated from the process typically in the form of a hydrogen sulfide gas. In these processes, nitrogen and metals are also removed to some extent from the hydrocarbon streams (i.e., "denitrogenation" and "demetalization"). However, nitrogen and/or metals are sometimes targeted for removal by "pre-processing" the hydrocarbon streams and removing a portion of the nitrogen and/or metals (which may include some amount of reaction cracking and/or desulfurization) prior to contacting the primary hydrodesulfurization or hydrocracking catalysts. Additionally, in these hydrodesulfurization or hydrocracking processes, some of the larger hydrocarbon molecules are "cracked" into smaller hydrocarbon molecules. This is generally called "cracking" or "conversion" and is a significant part of many of these hydroprocessing processes as this converts heavier, low value petroleum streams, such as gas oils and resids, into higher value products such as transportation fuels, for example, gasolines, jet fuels, and diesels.

There remains a need in the art to further improve the activities of hydroprocessing catalysts to make the processes of heavy hydrocarbon conversion and upgrading more economically attractive and feasible. In particular, catalysts with improved resistance to nitrogen- and sulfur-containing compounds are desirable.

BRIEF DESCRIPTION OF THE INVENTION

Exemplary embodiments of the current invention relate to catalysts and processes for hydroprocessing and/or reforming of a hydrocarbon-containing feedstream to produce a product stream with improved product qualities.

In one aspect, the invention features a catalyst including an active catalyst component having a surface, and a metal oxide film selectively coated onto the surface of the at least one active catalyst component without the entire catalyst being covered by such coating (unless the entire catalyst is comprised of only the metal oxide coated active catalyst component).

In certain embodiments of the catalyst of the present invention, the selectively coated catalyst component includes at least one transition metal element selected from Mo, W, Cr, V, Mn, Sn, Fe, Co, Ni, Pd, Ru, Ir, Rh, Ag and Pt. In certain embodiments, of the present invention, the selectively coated catalyst component includes an interstitial metal hydride.

In certain embodiments of the catalyst of the present invention, the metal oxide film includes alumina, silica, titania, zirconia, a polysiloxane, or combinations thereof.

In another aspect, the present invention features a method of making a catalyst including an active catalyst component having a surface, and a metal oxide film selectively coated onto the surface of the active catalyst component, including the steps of:

a) combining an active catalyst component and a metal oxide compound, in amounts sufficient to form a metal oxide film selectively upon the catalyst component to form a selectively coated catalyst component;

b) drying the mixture in an inert atmosphere; and c) calcining the dried mixture.

In another aspect, the present invention features a process for upgrading a hydrocarbon feedstream, including contacting a hydrocarbon feedstream with catalyst including an active catalyst component having a surface, and a metal oxide film coated selectively onto the surface of the active catalyst component, under hydroprocessing or reforming conditions to yield an upgraded hydrocarbon product stream. In more preferred embodiments, the hydrocarbon feedstream is contacted with such catalyst comprising a selectively coated catalyst component in the presence of hydrogen to yield an upgraded hydrocarbon product stream.

DETAILED DESCRIPTION OF THE INVENTION

Exemplary embodiments of the current invention relate to catalysts and processes for hydroprocessing or reforming a hydrocarbon-containing feedstream to produce a product stream with improved product qualities, by using a catalyst including a catalyst component with a metal oxide film selectively coated onto its surface. These new catalyst systems possess significant improvements in hydroprocessing or reforming of hydrocarbon feedstreams. Specifically, such a catalyst component with a metal oxide film coated onto its surface may be more resistant to nitrogen- and sulfur-containing poisons, providing catalysts with improved catalytic activities and increased long-term stabilities.

Definitions

As used herein, "improved product qualities" include, but are not limited, to increased hydrogenation (or increased hydrogen content by weight), lower average boiling point conversion (or "cracking"), higher API gravity, reduced viscosity, and lower levels of sulfur, nitrogen, and metals.

The terms "hydrocarbon-containing stream", "hydrocarbon stream" or "hydrocarbon feedstream" as used herein are equivalent and are defined as any stream containing at least 75 wt % hydrocarbons. These hydrocarbon feedstreams may include either "petroleum-based hydrocarbons", "biofuel hydrocarbons", or combinations thereof. The "petroleum-based hydrocarbons" are hydrocarbons obtained or derived hydrocarbonaceous materials from geological formations such as, but not limited to, crude oils, and oils derived from coal, tar sands, or bitumens, as well as any intermediate hydrocarbon or final hydrocarbon product derived from these sources. These are generally considered as non-renewable hydrocarbon sources.

As used herein, the terms "heavy hydrocarbon" or "heavy hydrocarbon stream" are equivalent and are defined herein as a subset of "petroleum-based hydrocarbons" and include hydrocarbon-containing streams containing at least 75 wt % hydrocarbons and having an API gravity of less than 20. Exemplary heavy hydrocarbon streams for use in the present invention include, but are not limited to low API gravity, high sulfur, high viscosity crudes; tar sands bitumen; liquid hydrocarbons derived from tar sands bitumen, coal, or oil shale; as well as petrochemical refinery heavy intermediate fractions, such as atmospheric resids, vacuum resids, and other similar intermediate feedstreams and mixtures thereof containing boiling point materials above about 343° C. (650° F.). Heavy hydrocarbon streams may also include a blend of the hydrocarbons listed above with lighter hydrocarbon streams for control of certain properties for transport or sale, such as, but not limited to fuel oils and crude blends.

As used herein, the term "biofuel hydrocarbons" or "biofuels" are equivalent and are a subset of hydrocarbon streams, and are defined as hydrocarbon-containing streams wherein at least 50 wt % of the hydrocarbon material in the hydrocarbon-containing stream is derived from renewable biomass resources. These biomass resources include any plant or animal derived organic matter, such as dedicated energy crops and trees, agricultural food and feed crops, agricultural crop wastes and residues, wood wastes and residues, aquatic plants, algae, fungi, plant oils, animal oils, animal tissues, animal wastes, municipal wastes, and other waste materials. Biofuels may include, but are not limited to, hydrocarbons in the middle distillate range, diesels, kerosenes, gasoline, gasoline fractions, biodiesel, biojet fuel, biogasolines and combinations thereof.

As used herein, the term "plant oil" is a subset of biofuels and is defined as a hydrocarbon-containing material derived from plant sources, such as agricultural crops and forest products, as well as wastes, effluents and residues from the processing of such materials. Plant oils may include vegetable oils. Examples of plant oils may include, but are not limited to, canola oil, sunflower oil, soybean oil, rapeseed oil, mustard seed oil, palm oil, corn oil, soya oil, linseed oil, peanut oil, coconut oil, corn oil, olive oil, and combinations thereof.

As used herein, the term "animal oil" is a subset of biofuels and is defined as a hydrocarbon-containing material derived animal sources, as well as wastes, effluents and residues from the processing of such materials. Examples of animal oils may include, but are not limited to, animal fats, yellow grease, animal tallow, pork fats, pork oils, chicken fats, chicken oils, mutton fats, mutton oils, beef fats, beef oils, and combinations thereof.

The term "hydroprocessing" (or equivalent term "hydrotreating") as used herein is a general term and is defined as any catalytic process involving hydrogen. This includes the reaction of any petroleum fraction with hydrogen in the presence of a catalyst. This includes processes which remove undesirable impurities such as sulfur, nitrogen, metals, and unsaturated compounds in the presence of hydrogen and a catalyst. Examples include, but are not limited to, hydrogenation, hydrocracking, hydrodesulfurization, hydrodenitrogenation hydrodemetalization, and catalytic hydrodewaxing.

The term "reforming" as used herein is a general term and is defined as any catalytic process involving contacting a hydrocarbon feedstream and a reforming catalyst wherein the primary reaction is to reform the hydrocarbon molecules into aromatic hydrocarbons and/or molecular isomers. They are characterized by only a small net use of hydrogen or a net production of hydrogen in the catalytic process (i.e., hydrogenation of molecules is not a primary reaction).

Typical catalytic reforming processes go by the general names of "catalytic reforming" or "isomerization", both processes which are considered herein as subsets of the term reforming processes as utilized herein.

As used herein, the term "hydroprocessing catalyst" is any catalyst that may be used in a hydroprocessing process as defined above. Conventional hydroprocessing catalysts may include a Group VI metal, a Group VIII metal (including noble and non-noble metals), or combinations thereof. For example, a hydroprocessing catalyst may include a combination of nickel or cobalt with molybdenum or tungsten. Alternatively, a hydroprocessing catalyst may include a noble metal such as palladium or platinum. A hydroprocessing catalyst may also be an interstitial metal hydride. The term "hydroprocessing catalyst" as used herein may refer solely to the coated active component (as used as a catalyst) or a combination catalyst incorporating a selectively coated active component of the invention herein.

As used herein, the term "reforming catalyst" is any catalyst that may be used in a reforming process as defined above. These catalysts typically include a noble metal component such as palladium or platinum, and can also include dopant metals such as tin. The term "reforming catalyst" as used herein may refer solely to the coated active component (as used as a catalyst) or a combination catalyst incorporating a selectively coated active component of the invention herein.

As used herein, the terms "interstitial metal hydride" or "iMeH" are equivalents and are defined as materials that are composed of alloyed metals combined with atomic hydrogen, wherein the atomic hydrogen occupies interstices within the metal alloy matrix. The terms "interstitial metal hydride" or "iMeH" are intended to refer solely to the iMeH component or components of the catalysts of the invention.

The terms "high pressure/high severity" and "severe" hydroprocessing conditions and/or processes are equivalents as used herein and are defined as hydroprocessing processes wherein a hydrocarbon feedstream is contacted with a hydroprocessing catalyst in the presence of hydrogen at process conditions of at least 400 psig and at least 200° C. In such embodiments of the present invention, the iMeH may be a "high severity hydroprocessing iMeH," also referred to herein as "CAT 400 iMeH" catalysts.

As used herein, the term "metal oxide" refers to a metal oxide compound such as, for example, alumina, silica, titania, zirconia, ceria, vanadia, or combinations thereof. As used herein, the "metal" component of the metal oxide may be a metalloid such as silicon. In some embodiments, a metal oxide may be a polymer having metal-oxygen bonds, such as a silicone (e.g., a polysiloxane).

As used herein, the terms "film", "coating", or "layer" refers to a coating or a layer of a metal oxide selectively applied onto the surface of at least one hydroprocessing or reforming active catalyst component.

The term "activity" as used herein, when referring to a catalyst of the invention, refers to the amount of a reactant consumed or the amount of a product produced per unit amount of time under a given set of reaction conditions. The activity may be measured, for example, by determining a rate constant. In a non-limiting example, the activity of a catalyst described herein may be measured by determining the first order rate constant for the disappearance of a compound in a model feed, e.g., the conversion (or disappearance) of dibenzothiophene, diethyldibenzothiophene or 1n-dodecylnaphthalenes.

"Group VI" and "Group VIII" refer to the older IUPAC groupings of the Periodic Table. Group VI metals include the elements chromium, molybdenum and tungsten. Group VIII metals include the elements iron, cobalt, nickel, ruthenium, rhodium, palladium, osmium, iridium, platinum. The term "transition metals" refer to the older IUPAC groupings of the Periodic Table of Group IIIA (Scandium group) through Group IIB (Zinc group), inclusively.

The terms "upgrade", "upgrading" and "upgraded", when used in conjunction with the hydroprocessing of a hydrocarbon feedstream, describes a hydrocarbon feedstream that is or has been subjected to hydroprocessing, or a resulting material or product stream, having a reduction in the molecular weight of the hydrocarbon compounds in the hydrocarbon feedstream, an increase in hydrogen content of the hydrocarbon compounds in the hydrocarbon feedstream, a reduction in the boiling point range of the hydrocarbon feedstream, and/or a reduction in the quantity of impurities such as sulfur, nitrogen, and metals. When the terms "upgrade", "upgrading" and "upgraded", when used in conjunction with the reforming of a hydrocarbon feedstream describes a hydrocarbon feedstream that is or has been subjected to reforming, or a resulting material or product stream, having either 1) a net increase in aromatic and/or cyclic hydrocarbon compounds and a net increase in molecular hydrogen, or 2) a net increase in isomers (non-linear paraffins) of hydrocarbon compounds that were present in the hydrocarbon feedstream (e.g., conversion of n-butane to iso-butane).

The term "hydrogenation" as used herein is defined as any process wherein a hydrocarbon feedstream is contacted with a catalyst and hydrogen at an elevated pressure and temperature wherein hydrogen is chemically added to at least a portion of the hydrocarbon compounds in the hydrocarbon feedstream, thereby increasing the hydrogen content of the hydrocarbon compounds. Exemplary hydrogenation applications include the hydrogen addition to "unsaturated" olefinic or aromatic hydrocarbon compounds (e.g., olefin hydrogenation or aromatic hydrogenation). Hydrogenation is a subset of hydroprocessing processes.

The term "hydrocracking" as used herein is defined as any process wherein a hydrocarbon feedstream is contacted with a catalyst and hydrogen at an elevated pressure and temperature wherein at least a portion of the hydrocarbon feedstream is converted into lower-boiling point products, thereby resulting in an overall lower average boiling point product stream based on wt %. Hydrocracking is a subset of hydroprocessing processes.

The term "hydrodesulfurization" or "HDS" as used herein is defined as a process in which a hydrocarbon feedstream is contacted with a catalyst and hydrogen at an elevated pressure and temperature wherein at least a portion the sulfur elements or compounds present in hydrocarbon feedstream are removed, thereby resulting in at least one hydrocarbon product with a lower sulfur content than the hydrocarbon feedstream. Hydrodesulfurization is a subset of hydroprocessing processes.

The term "hydrodenitrogenation" or "HDN" as used herein is defined as a process in which a hydrocarbon feedstream is contacted with a catalyst and hydrogen at an elevated pressure and temperature wherein at least a portion the nitrogen elements or compounds present in hydrocarbon feedstream are removed, thereby resulting in at least one hydrocarbon product with a lower nitrogen content than the hydrocarbon feedstream. Hydrodenitrogenation is a subset of hydroprocessing processes.

The term "hydrodemetalization" or "HDM" as used herein is defined as a process in which a hydrocarbon feedstream is contacted with a catalyst and hydrogen at an elevated pressure and temperature wherein at least a portion the metal elements or compounds present in hydrocarbon feedstream are removed, thereby resulting in at least one hydrocarbon product with a lower metal content than the hydrocarbon feedstream. Hydrodemetalization is a subset of hydroprocessing processes.

The term "catalytic hydrodewaxing" as used herein is defined as a catalytic hydrocracking process which uses molecular sieves, suitably zeolites, to selectively hydrocrack and/or isomerize waxes (i.e., long chain paraffinic molecules with greater than about 22 carbon molecules) present in the hydrocarbon streams to smaller carbon content molecules, thereby resulting in an overall lower average boiling point product stream based on wt %. Catalytic hydrodewaxing is a subset of hydroprocessing processes.

It is specifically understood that any numerical value recited herein includes all values from the lower value to the upper value, i.e., all possible combinations of numerical values between the lowest value and the highest value enumerated are to be considered to be expressly stated in this application. For example, if a concentration range or a beneficial effect range is stated as 1% to 50%, it is intended that values such as 2% to 40%, 10% to 30%, or 1% to 3%, etc., are expressly enumerated in this specification. These are only examples of what is specifically intended.

Also, it is to be understood that the phraseology and terminology used herein is for the purpose of description and should not be regarded as limiting. The use of "comprising," "including," "having," and variations thereof herein is meant to encompass the items listed thereafter and equivalents thereof as well as additional items. "Comprising" encompasses the terms "consisting of" and "consisting essentially of." The use of "consisting essentially of" means that a composition or method may include additional ingredients and/or steps, but only if the additional ingredients and/or steps do not materially alter the basic and novel characteristics of the claimed composition or method.

Active Catalyst Components

The active catalyst components of the catalyst of the present invention may be any known catalytically active metal, combination of active metals, or active metal compounds used in the art of hydroprocessing or reforming By "active" it is meant that the catalyst component acts to promote a catalytic reaction in the process use of such catalyst. For example, an active catalyst component may be a noble metal such as, and preferably selected from, Pd and Pt. Other hydroprocessing metals include those selected from transition metals, including from Group VI and Group VIII, and combinations thereof. For example, the active catalyst component may include Mo, W, Fe, Co, Ni, or combinations thereof. Exemplary active hydroprocessing catalyst components include Mo and at least one transition metal element selected from Ni and Co and combinations thereof.

Another example of an active catalyst component is an interstitial metal hydride (iMeH), which is a material that is composed of alloyed metals combined with atomic hydrogen, wherein the atomic hydrogen is stored interstitially within the metal alloy matrix.

U.S. Pat. Nos. 7,157,401 and 7,387,712 to Purta et al., which are incorporated herein by reference in their entireties, disclose hydroprocessing processes using iMeH catalysts. In these processes, hydrocarbon streams are contacted with iMeH catalysts under mild conditions (e.g., 200° C. at 50 psig), optionally in the presence of microwaves, for the hydrogenation of hydrocarbon molecules. In particular, these patents disclose three specific compositions of iMeHs: Cat 100 (or "$AT_5$ type"), CAT 200 (or "$A_2T_{14}B$ type") and CAT 300 (or "$A_2T$ type").

U.S. Patent Application No. 61/281,965, which is incorporated herein by reference in its entirety, discloses "high severity hydroprocessing iMeHs," which provide improved hydroprocessing of hydrocarbon streams at high temperatures (above 200° C.) and high pressures (above 400 psig) associated with many commercial hydroprocessing processes. The high severity hydroprocessing iMeHs have both significant hydrogen storage capacities under the processing conditions (i.e., the iMeHs are not depleted of hydrogen), as well as high hydrogen kinetics rates for the transfer of hydrogen into and out of the iMeHs under the hydroprocessing conditions (i.e., hydrogen atoms move in and out of the iMeH at a rapid rate). In particular, this application discloses specific compositions of iMeHs: Cat 400 (or "$AT_{2\pm d1\pm d2}$ type").

The metal alloy matrix of the iMeH component can have a crystalline or amorphous structure. The iMeH is especially suited to accommodating monatomic hydrogen extracted from molecular hydrogen. The hydrogen atoms occupy interstitial sites in the alloy lattice of the iMeH. The quantity of atomic hydrogen in the interstitial metallic hydrides has a measurable value, which is a function of alloy composition, and operating temperature and hydrogen partial pressure. In an iMeH, the ratio of hydrogen to metal atoms may vary over a range and may not be expressible as a ratio of small whole numbers. The iMeH components of the catalysts of the present invention are able to dissociate diatomic hydrogen molecules at the surface into monatomic hydrogen (i.e. hydrogen atoms), absorb copious amounts of monatomic hydrogen thus produced into the metal alloy, and desorb the monatomic hydrogen under the appropriate conditions. A heat of absorption is produced when the molecular hydrogen dissociates into atomic hydrogen and the hydrogen atoms position themselves interstitially in the structure of the material. Additional energy at a suitable steady state process temperature and pressure is required for the release of monatomic hydrogen from within the iMeH. This energy can be derived from the process heat of reaction or from external application of energy or both.

The iMeH components are produced by preparing samples of the constituent metals in the desired proportions, and combining them and heating them so that they melt together homogeneously to produce a metal alloy. The resulting metal alloy may then be exposed to hydrogen at a temperature and pressure characteristic of the alloy so that the metal alloy takes up the hydrogen in monatomic form.

It should be noted that the iMeH components may adversely react with oxygen and/or water thereby reducing their activity. As such, exposure to oxygen and/or water containing atmospheres should be minimized during fabrication, transportation, and reactor loading sequences, etc. One manner for handling such iMeH components is to surrounding the component and/or catalyst with a blanketing atmosphere such as nitrogen or argon that is pure or has been treated by a dryer or desiccant to remove water content.

The iMeH component materials as used in the present invention are typically prepared by a volumetric (gas to solid alloy) method at a known temperature and pressure using a stainless steel reactor. The metallic hydride will absorb hydrogen with an exothermic reaction. This hydrogenation process is reversible according to the following chemical reaction schematic:

Metal Alloy+$H_2$⇌iMeH+Energy

As noted, the hydrogen uptake/release is accompanied by an exothermic/endothermic exchange of energy. Hydrogen uptake/release is also accompanied by volume expansion/contraction of the iMeH which under certain conditions can be high as about 20 to 25 vol %. During this process, hydrogen atoms will occupy interstitial sites in the alloy lattice. This hydrogen absorption/desorption by an iMeH can be measured and characterized in a Pressure-Composition-Temperature ("PCT") plot or graph.

The metal alloy from which an iMeH component is produced can be prepared by mechanical or induction-heated alloying processes. The metal alloy can be stoichiometric or non-stoichiometric. Non-stoichiometric compounds are compounds that exhibit wide compositional variations from ideal stoichiometry. Non-stoichiometric systems contain excess elements, which can significantly influence the phase stability of the metallic hydrides. The iMeH is produced from a metal alloy by subjecting the alloy to hydrogen at a pressure and temperature that is a characteristic of the particular alloy.

The iMeH components of the catalysts of the present invention can be selected to have a desired lattice structure and thermodynamic properties, such as the applied pressure and temperature at which they can be charged and the operating pressure and temperature at which they can be discharged. These working thermodynamic parameters can be modified and fine tuned by an appropriate alloying method, and therefore, the composition of the catalysts can be designed for use in a particular catalytic process.

It should be noted that the coated iMeH catalysts of the present invention can be used starting with any interstitial metal hydride and such compositions of the present invention are not limited to the specific iMeHs disclosed herein. It is believed herein that the novel coating process and the benefits achieved thereby by the invention herein will operate with any known interstitial metal hydride. Exemplary embodiments of the iMeH suitably include a "CAT 100," "CAT 200," or "CAT 300" catalyst. The compositional formulations of CAT 100, CAT 200 and CAT 300 are shown as follows.

CAT 100
$AT_5$ Type
Crystal Structure: Hexagonal
General Formula: $A_{1-x}M_xT_{5-y-z}B_yC_z$
wherein:
A=Mm (mischmetal); T=Ni; M=La, Pr, Nd or Ce; B═Co; C═Mn, Al or Cr; and
x=0.0 to 1.0; y=0.0 to 2.5; and z=0.0 to 0.5.
CAT 200
$A_2T_{14}B$ Type
Crystal Structure: Tetragonal
General Formula: $A_{2-x}M_xT_{14-y}C_yD_zB$
wherein:
A=Nd or Pr; T=Fe; M=La, Pr, Nd or Ce; B=Boron; C═Co; D=Cr, Ni or Mn; and
x=0.0 to 2.0; y=0.0 to 14; and z=0.0 to 3.0.
CAT 300
$A_2T$ Type
Crystal Structure: Monoclinic
General Formula: $A_{2-x}M_xT_{1-y}B_y$
wherein:
A=Mg; T=Ni or Cu; M=La; B═Fe or Co;
x=0.0 to 0.5; and y=0.0 to 0.5.

In certain embodiments, the iMeH component is a "CAT 400" catalyst composition. The composition of the CAT 400 elements can be either stoichiometric or non-stoichiometric. The compositional formulations of CAT 400 are shown as follows. It should be noted that when $d_1$=0 and $d_2$=0, a stoichiometric composition of CAT 400 is shown.

CAT 400 (Stoichiometric & Non-Stoichiometric Compositions)
$AT_{2\pm d1\pm d2}$ Type
Crystal Structure: Compositionally dependent; Cubic Laves phase-C15 ($MgCu_2$-type) and Hexagonal Laves phase-C14 ($MgZn_2$-type)
General Formula: $A_{1-x}B_xT_{(2-y)\pm d1}C_{y\pm d2}$
wherein:
A=Nd or Zr; B=at least one of La, Ce, Pr, Gd, Tb, Dy, Er, Ho, Ti and Hf;
T=at least one of Fe and V; C=at least one of Cr, Mn, Fe, Co, Ni and Cu; and
x=0.0 to 1.0; and y=0.0 to 2.0; and
$d_1$=0.00 to 0.2; and $d_2$=0.00 to 0.2

In an exemplary embodiment of CAT 400, $d_1$=0; and $d_2$=0 (stoichiometric only compositions).
In an exemplary embodiment of CAT 400, $d_1$=0.05 to 0.2; and $d_2$=0.05 to 0.2 (non-stoichiometric only compositions).
In an exemplary embodiment of CAT 400, A=Zr and T=V.
In another exemplary embodiment of CAT 400, A=Zr and T=V; x=0.2 to 0.6; and y=0.2 to 0.6.
In another exemplary embodiment of CAT 400, A=Zr; B=at least one of Ti and Hf; T=V; C=at least one of Mn and Fe.
In a further exemplary embodiment of CAT 400, A=Nd or Zr; B=at least one of La, Ce, Pr, Gd, Tb, Dy, Er, Ho, Ti and Hf; T=at least one of Fe and V; C=at least one of Cr, Mn, Fe, Co, Ni and Cu; x=0.2 to 0.6; and y=0.2 to 0.6.
In a highly suitable embodiment of CAT 400, A=Zr; B=at least one of Ti and Hf; T=V; C=at least one of Mn and Fe; x=0.2 to 0.6; and y=0.2 to 0.6.
In another highly suitable embodiment of CAT 400, A=Zr; B=at least one of Ti and Hf; T=V; C=at least one of Mn and Fe; x=0.2 to 0.6; and y=0.

The CAT 400 iMeHs have high hydrogen storage capacities and high hydrogen kinetics rates at the high temperatures and pressures at which most commercial hydroprocessing processes operate. In particular, these high severity processes include, but are not limited to, hydrogenation, hydrocracking, hydrodesulfurization, hydrodenitrogenation, and hydrodemetalization processes.

Metal Oxide Films

The catalysts of the present invention include at least one active catalyst component with a metal oxide film coated on its surface. In the catalysts of the present invention, at least one active catalyst component, but no all catalyst components are selectively coated with a metal oxide film. While not being bound by any particular theory, it is believed that certain active catalyst components activate molecular hydrogen, resulting in the formation of monatomic hydrogen. However, nitrogen- and sulfur-containing compounds may bind to these active metals of the catalyst component, deactivating the hydrogen activation/catalytic sites. In light of the present invention, selectively coating the surface of the active catalyst component with a metal oxide film may provide protection from heteroatom-containing or polyaromatic molecules in the hydrocarbon feedstream, while still allowing hydrogen absorption and dissociation into monatomic hydrogen.

The metal oxide films may include any metal oxide. Exemplary metal oxides include silicon dioxide (silica), aluminum oxide (alumina), titanium dioxide (titania), zirconium oxide (zirconia), cerium(IV) oxide (ceria) and vanadium(V) oxide (vanadia), or combinations thereof. The metal oxide may be in any form, and include, for example, fumed and colloidal metal oxides (e.g., fumed silica or fumed titania).

A metal oxide film may also be a polymer that has metal-oxygen bonds. An example of such a polymer is a silicone, which has a silicon-oxygen backbone ( . . . —O—Si—O—Si—O— . . . ) with two additional organic side chains attached to each silicon atom. For example, the metal oxide film may be formed from a polysiloxane, such as, for example, phenyl methyl polysiloxane.

A metal oxide film may be deposited onto the surface of the hydroprocessing catalyst component by a number of methods. In the case of a fumed metal oxide such as CAB-O-SIL®, the hydroprocessing catalyst component may be coated by slurry immersion and mixing in an aqueous solution, followed by drying under an inert atmosphere. In the case of a polymer such as a polysiloxane, the hydroprocessing catalyst component may be combined with an organic solution of the polysiloxane (e.g., a decane solution), followed by drying under an inert atmosphere. In some embodiments, the hydroprocessing catalyst may be bound to a support prior to coating with the metal oxide film.

It should be noted, that in the embodiments of the present invention, at least one of the active catalyst components is selectively coated with the metal oxide film. That is, although metal oxides are known as components in some catalysts, they are generally utilized as an active component and/or support of other catalytic components in the catalysts. That is, they are generally just "mixed" within the overall catalyst formula as a general component of the catalyst.

In the present invention, a thin metal oxide film is used to selectively coat at least one active catalyst component of the catalyst or catalyst system, particularly those components which need accessibility of hydrogen in the process feedstream (preferably a combination comprised of hydrocarbons and hydrogen), while not applying the coating to the overall catalyst (unless the catalyst component is the only component of the overall catalyst). While not wishing to be held to any particular theory, it is believed that the selective coating of the present invention allows the selective moving of smaller, desirable molecules, in particular hydrogen, to diffuse to the surface of the "coated" active catalyst component, react, and then have a permeable pathway back to the surface of the catalyst and the process feedstream where it can react catalytically in hydroprocessing or reforming reactions of the feedstream. It is further believed that this selective coating impairs similar access of undesirable contaminant feedstream components, such as nitrogen and/or sulfur, to the surface of the coated catalyst component where they may deactivate/reduce the catalytic activity of the component.

Here, the entire catalyst is not formed with the mixed metal oxide as simply a catalyst component nor is the entire catalyst coated with a mixed metal oxide film (unless the catalyst component is the only component of the overall catalyst) as this may be undesirable in that such approaches may unduly limit the activities of catalyst components that may not react adversely to such contaminant feedstream components, and may require unrestricted accessibility to some of the larger process feedstream compounds for the desired catalytic reactions to occur.

While not so limited, particularly beneficial applications of embodiments herein are where a noble metal (such as Pt or Pd) is coated then utilized as a catalytic component as these materials, especially in their sulfided form, can be particularly subject to deactivation in the presence of even small amounts of nitrogen compounds, and to a lesser extent, in the presence of sulfur compounds. Another particularly beneficial application of embodiments herein are where an interstitial metal hydride (iMeH) is utilized as a catalytic component as these materials can be particularly subject to deactivation in the presence of even small amount of nitrogen compounds, and to a lesser extent, in the presence of sulfur compounds. While these two classes of materials appear to have significant deactivations in the presence of these contaminant compounds, it is not suggested herein that the reactive mechanisms for these deactivations are the same or even similar.

In embodiments of the present invention, it is desired that the coating be permeable to hydrogen. Even more preferably, the coating should have a reduced access (reduced permeability) of nitrogen and/or sulfur compounds to the surface of the coated active catalyst component. In preferred embodiments, the weight of the mixed metal oxide coating on the catalyst component is at least 0.1 wt % based on the weight of the catalyst component. More preferably the weight of the mixed metal oxide coating on the catalyst component is at least 5 wt %, even more preferably at least 10 wt %, most preferably at least 25 wt %, based on the weight of the catalyst component.

After coating the metal oxide film on the surface of the catalyst component, the hydrogen uptake by the catalyst of the invention can be determined. For example, hydrogen chemisorption data for certain catalysts of the invention are shown in Table 1. These illustrate that the hydroprocessing component of the catalyst may remain accessible to hydrogen when coated with the metal oxide film. As such, it is believed that the applied coating of the present invention may provide a porous medium through which the hydrogen (or monatomic hydrogen) atoms can move in and out of the hydroprocessing component.

Catalyst Activities

The activities of catalysts of the invention may be assayed using model feeds, for example, a poly-alpha-olefin ("PAO") based model feed. The model feed may be spiked with certain molecules in order to assay certain activities, such as hydrogenation activity and hydrodesulfurization (HDS) activity. Non-limiting examples of such model compounds include HDS substrates dibenzothiophene (DBT) and diethyldibenzothiophene (DEDBT), and hydrogenation substrates 1n-dodecylnaphthalenes ($C_{12}$ naphthalenes). The activities of the catalysts may be determined by measuring the first order rate constants for the conversion (or disappearance) of these compounds from the model feeds.

Catalyst Formulations

Herein, a new concept of "core-shell" structured catalyst is disclosed wherein at least a portion of the active sites of at least one component of the catalyst are protected by porous layers. Molecular hydrogen can move into the protective layer and monotonic hydrogen can move out of the protective layers. Active sites coated with protective layers can sustain catalyst activity in a chemical harsh environments, (i.e. those with poisons present, S, N, PAHs). Without protective coating, many catalysts, particularly containing such components as noble metals or interstitial metal hydrides, are severely deactivated by poisons such as sulfur, nitrogen compounds, and other impurities. For example, this type of structured catalyst can find application in reforming processes (i.e., catalytic reforming or isomerization). When catalysts described herein are utilized in reforming processes, the pre-treatment of feedstocks to remove impurities, such as nitrogen and sulfur, prior to contacting the reforming catalysts may be minimized or eliminated which can significantly reduce reforming processing costs. Alternatively, feedstocks that prior could not be sent to a reforming unit (without pre-treatment) may be able to be utilized as feedstocks or feedstock components, thereby significantly increasing the value of the products derived from these feedstocks.

The coated catalyst components described herein may be used alone, or they can be combined with other components such as additional catalyst materials to make a multicomponent hydroprocessing or reforming catalyst. For example, the catalysts can be combined with additional known hydroprocessing or reforming catalyst components such as noble metals, metal oxides, metal sulfides, zeolitic acid or base sites to further promote hydroprocessing of feedstocks such as organic compounds. The catalysts of the invention can be combined with other materials, such as catalytic supports and/or binder materials, in a variety of ways to build an optimized catalyst for a particular reaction or function.

The coated catalyst components can be combined with a support and optionally other catalytic elements to produce a composite catalyst. The support can provide for the physical dispersion of the additional catalytic components, thereby resulting in greater composite catalyst surface area and ease of handling.

The support also serves to increase the surface area of the additional active catalytic elements, and thereby, increase the process reaction rates. The support can also add acidic or basic sites that can enhance the catalytic activity of other catalyst components or acts as catalysts themselves. The support also serves to disperse the catalytic sites so as to prevent arcing in the presence of a strong electric or magnetic fields that may be used to expedite catalytic action. In some embodiments, the hydroprocessing catalyst component may be dispersed on to the support prior to coating with the metal oxide film.

The support may be an inorganic oxide, a metal, a carbon, or combinations of these materials. In certain embodiments of the present invention, the support includes alumina, silica, titania, zirconia, or combinations thereof. The catalysts and optional additional catalytic elements can be dispersed as mechanically mixed powders, or can be chemically dispersed, impregnated or deposited. When mixed powders are used in the present invention, the powder particle size is controlled to provide a powder that has particles that are small enough to provide suitable surface area and reactivity, but not so fine as to produce significant surface oxidation.

The catalyst may further include a radio frequency or microwave absorber, particularly when the hydroprocessing catalyst component is an interstitial metal hydride. In some embodiments, the radio frequency or microwave absorber may be in thermal contact with the interstitial metal hydride. The separate radio frequency or microwave absorber absorbs the energy and transfers it to the iMeH through thermal conduction or convection. These absorbers may be added metal elements or metal compounds with high dielectric constants, and may be, for example, one or more compounds such as silicon carbide, iron silicide, nickel oxide, and tungsten carbide. In another embodiment of the invention, the iMeH component functions as the primary absorber of RF or microwave energy. When used with microwave enhancement, the iMeH component is sufficiently dispersed within the catalyst and feedstock combination to avoid hot spots and arcing generally associated with the introduction of metals into a microwave or RF field.

Catalytic Processing of Hydrocarbon Feedstreams

Embodiments of catalysts of the invention are particularly beneficial when utilized in the conversion of hydrocarbon feedstreams in petroleum refining or petrochemical refining processes.

In particular, the catalyst embodiments of the present invention are particularly beneficial when utilized in either hydroprocessing or reforming processes in which there is significant nitrogen present in the feedstream which can be a catalytic poison to certain catalysts or catalyst components, which poisons can significantly reduce the catalytic activity of certain active metals. In particular these metal compounds can be comprised of transition metals, in particular Group VI metals, Group VIII metals, and noble metals, or can be comprised of interstitial metal hydrides. Particular Group VI and Group VIII metals of concern are selected from Mo, W, Cr, V, Mn, Sn, Fe, Co, and Ni. Particular noble metals of concern are selected from Pd, Ru, Ir, Rh, Ag and Pt. Contact of interstitial metal hydrides with nitrogen, in particular organic nitrogen in the hydrocarbon feedstream is also particularly problematic and can lead to severe loss of the hydride's activity.

Catalysts embodied herein can be particularly beneficial when used in contact as catalyst components when such catalyst is in contact with a hydrocarbon feedstream with at least 10 ppm nitrogen. The catalysts herein are also beneficial when the feedstream contains any of the following nitrogen contents: 1) at least 50 ppm nitrogen, 2) at least 100 ppm nitrogen, 3) at least 500 ppm nitrogen, 4) at least 1000 ppm nitrogen, 5) from 10 to 5000 ppm nitrogen, or 6) from 50 to 2000 ppm nitrogen. The nitrogen content may be comprised of molecular nitrogen as well as nitrogen compounds. Of particular concern are the organo-nitrogen compounds in the feed.

Due to nitrogen poisoning of catalysts, most hydroprocessing and reforming processes in the art require pre-treatment of hydrocarbon feedstreams to remove nitrogen to acceptable levels prior to contacting the catalysts. Many hydroprocessing and most reforming processes in the art also require pre-treatment of hydrocarbon feedstreams to remove sulfur to acceptable levels prior to contacting the catalysts.

The catalysts of the invention may be used in a hydroprocessing process. In an exemplary embodiment of the present invention, a hydrocarbon stream and/or a heavy hydrocarbon stream is contacted with a catalyst of the invention in the presence of hydrogen. In some embodiments, the hydrocarbon stream and/or heavy hydrocarbon stream contains at least 1 wt % sulfur and more suitably at least 3 wt % sulfur.

In other exemplary embodiments of the present invention, the hydrocarbon stream and/or the heavy hydrocarbon stream that is desulfurized in the present process contains polycyclic sulfur heteroatom complexes which are difficult to desulfurize by conventional methods.

Although not required for the use of the present invention, the catalytic activity of the catalysts of the present invention can be enhanced and controlled by exposing the catalysts to radio frequency ("RF") energy (about $3 \times 10^5$ Hz to about $3 \times 10^8$ Hz) or microwave energy (about $3 \times 10^8$ Hz to about $3 \times 10^{12}$ Hz), either in the absence of, the presence of, or in sequence with conventional fuel fired heating or resistive heating. This is particularly the case when the hydroprocessing catalyst component is an iMeH. The RF or microwave energy can provide for a significant increase in hydroprocessing efficiency in comparison to conventional heating. Furthermore, the microwave energy can be modulated and controlled in such a manner as to optimize the reaction exchange of the monatomic hydrogen from the iMeH. When used with microwave enhancement, the iMeH component is sufficiently dispersed within the catalyst and feedstock combination to avoid hot spots and arcing generally associated with the introduction of metals into a microwave or RF field.

The selective use of RF or microwave energy aids in the release of the iMeH monatomic hydrogen. It is cost effective to maximize the use of fossil fuels to pre-heat the feedstocks to near reaction temperatures, and use minimum RF or microwave energy to drive and control the hydroprocessing reactions. Ideally, there will be a minimized or zero net temperature increase from the RF or microwave energy into the catalyst support, if present, or into the feedstock because this energy is primarily targeted into the iMeH to enhance the reaction exchange of monatomic hydrogen. Selective coupling of the RF or microwave energy is accomplished through selection and control of the relative dielectric parameters of the catalyst's components and the feedstock. This results in efficient, economically viable catalytic processes, which are enhanced using microwaves.

Figure 1:
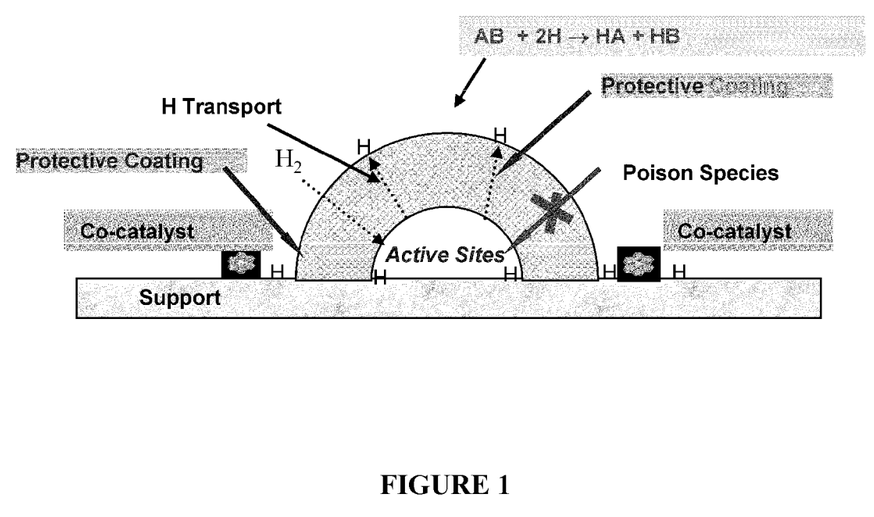
FIG. 1 is a representation of one exemplary catalyst of the invention. A supported hydroprocessing catalyst having active sites, wherein one of the active material components (shown as "active sites") is coated with a protective coating of a metal oxide film (not drawn to scale). Molecular hydrogen may pass through the protective coating to the coated catalytic component, where it is activated. The resulting monatomic hydrogen passes back through the protective layers where it may react with a component of the feedstream or spillover to a co-catalyst or other active component of the catalyst. The protective coating significantly reduces the access of poisons in the feedstream from contact with the hydrogen activation sites.
Figure 2:
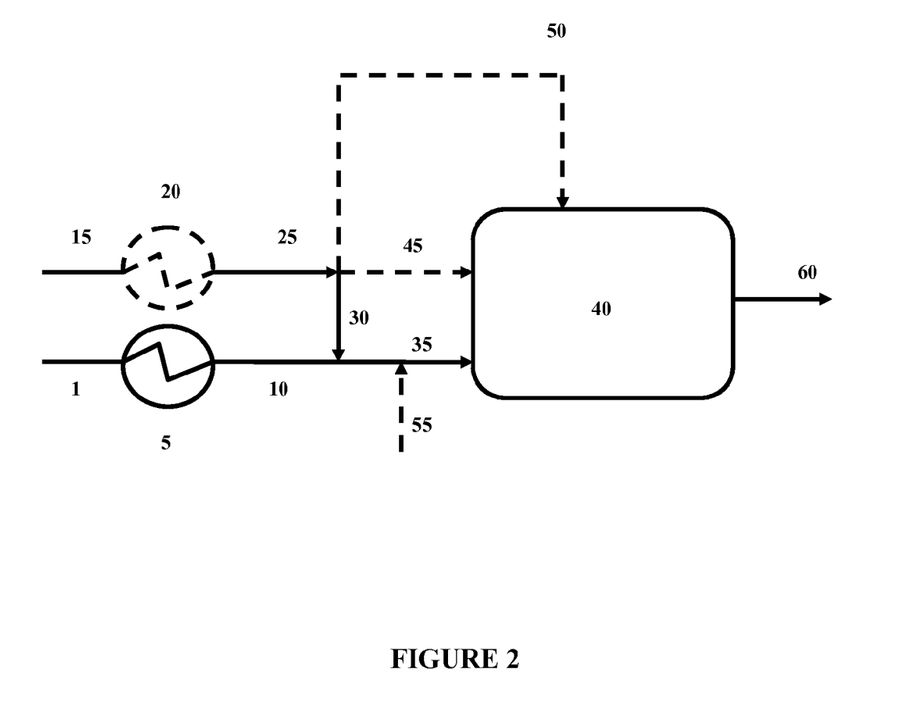
FIG. 2 is a simplified schematic of an exemplary reaction process configuration using the catalysts of the present invention.

A schematic of an exemplary process configuration using the catalysts of the present invention is shown in FIG. 2 wherein the incoming hydrocarbon feedstream is heated to a target temperature prior to entering the reactor and the RF or microwave energy is introduced into the reactor itself. FIG. 2 shows an exemplary embodiment of the present invention wherein a single stage reactor unit is used. Here, a hydrocarbon stream (1) is heated to a predetermined elevated temperature utilizing a fired heater or heat exchange unit (5) to produce a heated hydrocarbon feedstream (10). Similarly a hydrogen-rich stream (15) can be heated, if necessary, a fired heater or heat exchange unit (20) to produce a heated hydrogen-rich stream (25). The term "hydrogen-rich stream" as used herein is a stream containing at least 50 mole percent (mol %) of hydrogen. In an exemplary embodiment, at least a portion of the heated hydrogen-rich stream (25) is combined via (30) with the heated hydrocarbon feedstream (10) to form a heated combined hydrocarbon feedstream (35) which is fed to the hydroprocessing reactor unit (40). In an optional embodiment, some, or all, of the heated hydrogen-rich stream enters directly into the hydroprocessing reactor unit (40) via line (45). Even more suitably, at least some of the heated hydrogen-rich stream (25) is fed to various points (50) within the hydroprocessing reactor unit (40) itself. This added hydrogen in the reaction process assists in maintaining a sufficient hydrogen concentration within the reactor itself as well as providing fresh hydrogen for absorption/desorption by catalysts.

Continuing with FIG. 2, in an exemplary embodiment, the catalyst is substantially maintained in the hydroprocessing reactor unit (40) itself. However, in other embodiments, a portion or all of the catalyst is introduced into the feedstream entering the reactor (55) as a slurry or particulate catalyst. Although the catalyst is shown entering the feedstream system at point (55), the catalyst can be entered in to the hydrocarbon feedstream, the heated hydrocarbon feedstream, and/or the hydrogen-rich stream at any point prior to entering the hydroprocessing reactor unit (40). In an exemplary embodiment, RF or microwave energy is supplied to the catalyst/hydrocarbon/hydrogen mixture in the hydroprocessing reactor (40) to assist in promoting the absorption and desorption of the monatomic hydrogen in the catalysts. Continuous, pulsed, frequency modulated and/or two or more frequencies of RF or microwave energy may be used.

A reaction product stream (60) is withdrawn from the hydroprocessing reactor (40). This stream will typically contain some gaseous hydrocarbon products and hydrogen along with a liquid hydrocarbon product stream. These gaseous products can be separated by processes known in the art and the liquid hydrocarbon product stream with improved product qualities is retrieved.

In some embodiments, the operating (or "reaction") conditions are at least 400 psig and at least 200° C. More suitable reaction conditions are at least 600 psig and at least 250° C. Suitable hydrogen partial pressures are at least about 350 psia, and even more suitably at least about 500 psia. Most suitably, the reaction conditions are within the operating envelope of about 200° C. to about 450° C. with an operating pressure of from about 400 psig to about 2500 psig.

Hydroprocessing configurations using the catalysts of the present invention, which incorporate additional process stages and hydroprocessing reactors to those described above may be also be used in the processes of the present invention and may also be coupled with interstage and/or inter-reactor separations steps to separate liquid hydrocarbon-containing reaction streams from gaseous hydrocarbon-containing reaction streams and/or to incorporate separation steps for separating the catalysts from the hydrocarbons in order to improve overall selectivity and conversion of the final hydrocarbon products as would be within the purview of one of skill in the art in light of the present invention disclosure.

The catalysts of the present invention can be used in any hydroprocessing process. Specific hydroprocessing processes in which the catalysts of the present invention can be used include, but are not limited to the following processes: hydrogenation, dehydrogenation, hydrocracking, hydrodesulfurization, hydrodenitrogenation, hydrodemetalization and catalytic hydrodewaxing.

The catalysts of the present invention can also be used in any reforming process. Specific reforming processes in which the catalysts of the present invention can be used include, but are not limited to the following processes: catalytic reforming and catalytic isomerization.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

EXAMPLES

Example 1

This example describes how the Pt hydroprocessing catalysts deposited on $Al_2O_3$ used in the Examples herein, including those used in the catalysts of the invention, were fabricated. While the coated hydroprocessing catalyst compositions of present invention are believed to operate with any hydroprocessing catalyst, Pt-based samples were used in the testing of some of the following Examples to provide proof of concept on a comparative standard basis.

Preparation of 1% Pt/$Al_2O_3$

Pt was deposited onto an $Al_2O_3$ support by impregnation of an aqueous solution of $(NH_3)_4Pt(NO_3)_2$. The Pt metal loading on the supports was targeted at 1 wt %. After impregnating, the sample was placed in a glass dish at room temperature for 60 min to reach equilibrium. Then it was dried in air at 250° F. for 4 hrs. The furnace was ramped at 10° F./min from room temperature to 662° F. in air, and stayed at 662° F. for 4 hrs. The air follow rate for the calcination was adjusted at 5 vol/vol cat/min.

Preparation of $SiO_2$/1% Pt/$Al_2O_3$

1% Pt/$Al_2O_3$ was used as a starting support for deposition of $SiO_2$ layers with DOW 550 phenyl methyl polysiloxane. In a fume hood, 1% Pt/$Al_2O_3$ powders were impregnated with a decane solution containing 11 wt % DOW 550 silicone. The sample was placed in a drying oven, then it was purged with nitrogen for 1 hour to remove air before drying. The sample was dried at 160° F. overnight in nitrogen environment. After drying step, the sample was placed in a box furnace for calcination. The calcining furnace was ramped in $N_2$ from room temperature to 1000° F. at 5° F./min rate. The furnace was held at 1000° F. for 1 hour. Then the calcining atmosphere was gradually switched from $N_2$ to a mixture gas containing 40% oxygen and 60% nitrogen in a period of 2 hours. The final treatment was carried out in the mixture gas at 1000° F. for 6 hours. The silica coating was repeated 3 times, defined as 1× coating, 2× coating and 3× coating. The 1× silica coating was designed to have approximately 4 wt % $SiO_2$ loading on 1% $Pt/Al_2O_3$, 2× silica coating has approximately 8 wt % $SiO_2$ content on 1% $Pt/Al_2O_3$, and 3× coatings gives approximately 12 wt % $SiO_2$ on 1% $Pt/Al_2O_3$.

Example 2

This example describes how the hydrogen chemisorptions and PT dispersions were calculated for the siloxane-coated $Pt/Al_2O_3$ samples, prepared as in Example 1.

Hydrogen Chemisorption

The Micromeritics ASAP 2010 Chemi System® was used to measure hydrogen chemisorption and to calculate Pt dispersion. The supported Pt samples were dried in situ under helium at 200° C. for 30 minutes to remove moisture. The sample reduction in hydrogen was carried out at 300° C. or 500° C., in hydrogen for 30 minutes. The ramping rate was controlled at 5° C./min. After reduction, the sample chamber was evacuated at 300° C. or 500° C. for 1 hour, then the reactor was cooled down to room temperature while the system was still under vacuum evacuation. The hydrogen isotherm was measured at room temperature. The H/Pt was calculated by extrapolation of the isotherm profile to zero hydrogen pressure.

In Table 1, the H/Pt ratio for 1% $Pt/Al_2O_3$ was 1.34 when the sample was reduced at 300° C. The H/Pt ratio was 1.28 when the sample was reduced at 500° C., a mild Pt metal sintering occurred at 500° C. reduction in hydrogen. However, after the 1× coating of silica (DOW 550) on 1% $Pt/Al_2O_3$, the H/Pt reduced to 0.29. Silica coating reduces available sites of Pt, which results in lower catalytic activity. Here it can be seen that at 1× coating and 300° F. reduction temperature, it is estimated that the available Pt sites were reduced to about 22% of the uncoated value (i.e., 0.29/1.34*100). As more silica layers, such as 2× silica coating, 3× coating were progressively deposited on 1% $Pt/Al_2O_3$, H/Pt ratios were gradually reduced. More Pt sites became inaccessible. However, when the samples of silica coated 1% $Pt/Al_2O_3$ were reduced at higher temperature, 500° C., improvements in the H/Pt ratios were experienced. Here it can be seen that at 1× coating and 500° F. reduction temperature, it is estimated that the available Pt sites were reduced to only about 35% of the uncoated value (i.e., 0.43/1.28*100), which shows an improved activity retention when compared to using the 300° F. reduction temperature. It is possible that the pore structures of silica coating were opened up when the samples were reduced at higher temperatures. Preferably, in the process of making the coated catalyst component system, the active catalyst component coating is reduced at a temperature of at least 300° C., more preferably at least 400° C., and most preferably, at least 500° C.

TABLE 1

Hydrogen Chemisorption Data on Coated $Pt/Al_2O_3$

| Samples | $SiO_2$ Coating | $SiO_2$ Loading by ICP Analysis | H/Pt, 300C Reduced | H/Pt, 500C Reduced |
|---|---|---|---|---|
| 1 wt % $Pt/Al_2O_3$ | 0 | 0 | 1.34 | 1.28 |
| 1 wt % $Pt/Al_2O_3$ | 1X (Dow 550) | 4.0% $SiO_2$ | 0.29 | 0.43 |
| 1 wt % $Pt/Al_2O_3$ | 2X (Dow 550) | 7.7% $SiO_2$ | 0.18 | 0.28 |
| 1 wt % $Pt/Al_2O_3$ | 3X (Dow 550) | 11.6% $SiO_2$ | 0.11 | 0.19 |

Example 3

This example describes how the CAT 400 iMeH components used in the Examples herein, including those used in the catalysts of the invention, were fabricated. While the coated iMeH compositions of present invention are believed to operate with any interstitial metal hydride (iMeH), the CAT 400 composition samples were used throughout in the testing of some of the following Examples to provide proof of concept on a comparative standard basis.

Chemical Compositions

The chemical composition of the CAT 400 iMeHs prepared in the Examples was $ZrV_2$.

IMeH Sample Preparations

The metal alloys were prepared by melting together the appropriate amounts of metals with purities of 99.9% (from Alfa Aesar/Johnson Matthey Company™) in an argon atmosphere using water cooled copper hearth argon arc furnace Model CENTORR® from Centorr Vacuum Industries™, Nashua, N.H. Each arc-melted ingot was flipped over and re-melted three times and was normally held in the liquid state for approximately 30 seconds to insure complete mixing of the starting materials.

To obtain single phase materials, the cast samples were sealed in quartz tubes, filled with ⅓ atmosphere of argon gas and annealed at 950° C. for a period of 3 to 5 days using a Thermo scientific LindbergBlue™ tube furnace. The samples in the tubes were water quenched to avoid a possible phase transition during the cooling process.

The crystal structures of the samples were determined by X-ray diffraction.

CAT 400 is based on $ZrV_2$ with a purity of about 99.9%. The reduction in the sample weight was negligible. The crystal structure was determined to be single phase with cubic Laves phase C15 ($MgCu_2$) type for $ZrV_2$ alloys.

The metal alloy bulk was crushed manually to an average particle size of approximately 200 μm (microns). The hard alloy samples were milled mechanically at cryogenic temperatures (approximately 80° K) and then were attrited. All samples were sieved to under approximately 200 μm (microns).

All particle size preparations of the samples were performed under inert nitrogen atmosphere conditions. The average particle size distribution was obtained using Horiba Laser-La-920® Particle Analyzer, from HORIBA Instruments™, Inc., Irvine, Calif.

iMeH Catalyst Activation

Approximately 4 to 5 grams of metal alloy powder with known molecular weight was then placed into the stainless steel reactor connected to the Hy-Energy™ system. The reactor was then purged with hydrogen three times. $H_2$ pressure is introduced to the sample chamber from about 500 psig to about 800 psig at ambient temperature (i.e., 25° C.) and a waiting period is given to observe if any absorption takes place. A pressure drop in the reactor, generally in the range of about 20 psig depending on the amount of hydrogen absorbed, will indicate the hydrogen activation process. Typical waiting period times are from 10 to 30 minutes. If no absorption occurs, then the temperature is raised to about 250° C. The temperature needed to activate the sample depends on the active surface of the alloy. The sample starts absorbing hydrogen which is an exothermic process. The hydrogen activated sample is then cooled down to ambient temperature and pressure to achieve maximum hydrogen absorption.

Example 4

This example describes how the Cat400 iMeH components were coated with a thin film of silica to form exemplary catalysts of the invention. In this example, the CAT 400 formulation was $ZrV_2$ as described in Example 2.

Preparation of CAB-O-SIL®/$ZrV_2$ Catalysts

CAB-O-SIL® was deposited onto iMeH $ZrV_2$ by slurry immersing and mixing. CAB-O-SIL® fumed silica powders were dispersed into water by stirring. Attritted $ZrV_2$ powders were then slowly added into CAB-O-SIL® aqueous slurry. The mixture system was kept stirring for 30 minutes to ensure uniform distribution of CAB-O-SIL® in the slurry. At room temperature, the sample was placed in a drying oven and purged with nitrogen for 4 hrs to remove any residual air/oxygen in the oven. The sample drying was carried out at 140° F. overnight with a $N_2$ flow. After drying, the sample was placed in a nitrogen filled bag and pressed at 30 tons for 10 min. The sample wafers were broken into pieces of chunks/particles, which are placed inside a tube furnace and purged with $N_2$ for 2 hrs. The flow rate of nitrogen is adjusted to 5 vol./vol. cat/min. The system pressure was adjusted to 15 psig. The system temperature was increased from room temperature to 250° F. at 10° F./min ramping rate and held at 250° F. for 1 hr. The tube furnace temperature was increased further to 850° F. in at 10° F./min and held at 850° F. for 3 hrs. The CAB-O-SIL® silica loadings on $ZrV_2$ were designed to have approximately 6.25 wt %, 12.5 wt % and 25 wt % based on the weight of the iMeH ($ZrV_2$), respectively.

Example 5

This example describes how the CAB-O-SIL®/$ZrV_2$ catalysts were calcined and characterized by X-ray powder diffraction.

X-Ray Powder Diffraction

XRD analyses of the samples were obtained using a Bruker D4 Endeavor®, manufactured by Bruker AXS and equipped with a Vantec-1 high-speed detector. The 2 theta scan used a Cu target at 35 kV and 45 mA. The diffraction patterns were taken in the range of 2° to 70°. The step size is 0.01794 degrees and the time/step is 0.1 second.

Calcination and Characterization

Figure 3:
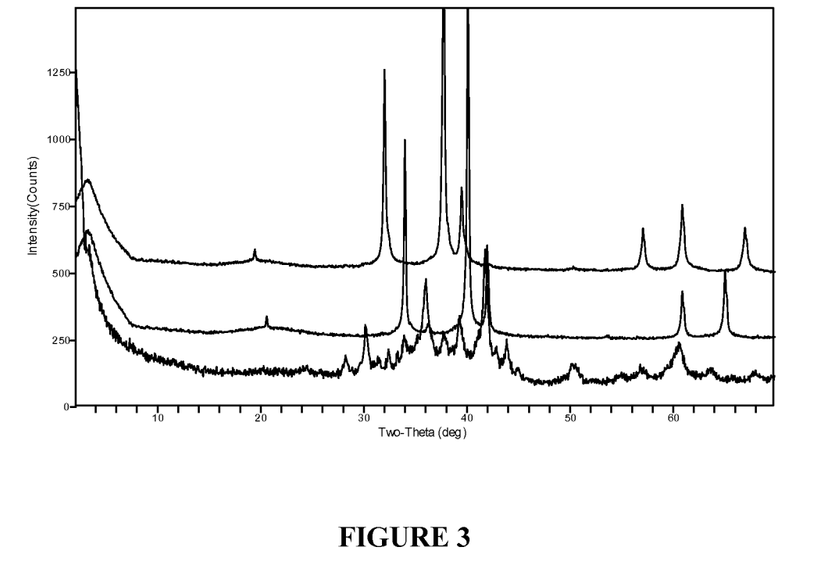
FIG. 3 depicts X-ray powder diffraction patterns of a $ZrV_2$ iMeH hydroprocessing catalyst, hydrogenated $ZrV_2H_{4.5}$, and $ZrV_2$ coated with CAB-O-SIL®.

The calcination of CAB-O-SIL® coated $ZrV_2$ was carried out in a nitrogen atmosphere to prevent the oxidation of $ZrV_2$ metal hydrides. The reactor system was purged with nitrogen for 2 hours to remove any residual air/oxygen prior to calcination. When the calcination temperature of CAB-O-SIL®/$ZrV_2$ in nitrogen reached 850° F., a temporary temperature spike up to 1100° F. was observed. The temperature spike lasted about 5 minutes. Afterwards, the reactor temperature was back down to the setting temperature of 850° F. and stayed at this temperature for 3 hrs. The X-Ray Diffraction patterns of the resulting hydrided CAB-O-SIL®/$ZrV_2$ (CAB-O-SIL®/$ZrV_2H_x$) is shown in FIG. 3, along with the X-Ray Diffraction patterns of the $ZrV_2$ and $ZrV_2H_{4.5}$.

Example 6

The procedures of this example were used to measure the activities of the catalysts of the invention in the presence of model feeds.

HiP/HOSS, standing for High Pressure Reactors and Heated Orbital Shaker System, is a batch reactor unit used for catalyst activity evaluation. The catalyst samples were pretreated in nitrogen at 150° C. for 1 hr. The catalysts were then sulfided at two stages, i.e., 250° C. for 2 hrs, and 360° C. for another 2 hrs. 10% $H_2S$ balanced with $H_2$ was used for sulfiding. After sulfiding, the catalysts were cooled down to 25° C. under hydrogen flow and were purged with nitrogen for another 1.5 hrs before additions of the model feeds. Feeds with three model compounds were used for catalyst activity evaluation. These three model feeds are 0.3% dibenzothiophene (DBT), 0.3% 4,6-diethyldibenzothiophene (DEDBT), and 1% 1n-dodecyl (C12) naphthalene in a solvent of poly alpha olefins (6 cSt). These three model feeds could also contain acridine as a nitrogen compound, ranging from 0-1500 ppm N. The catalytic evaluation tests were carried out at 280° C. with 0.5 to 2 VHSV and hydrogen partial pressure of 200 psig. The activities reported here are either platinum or $ZrV_2$ weight based first order rate constants.

1% $Pt/Al_2O_3/SiO_2$ Samples

Figure 4:
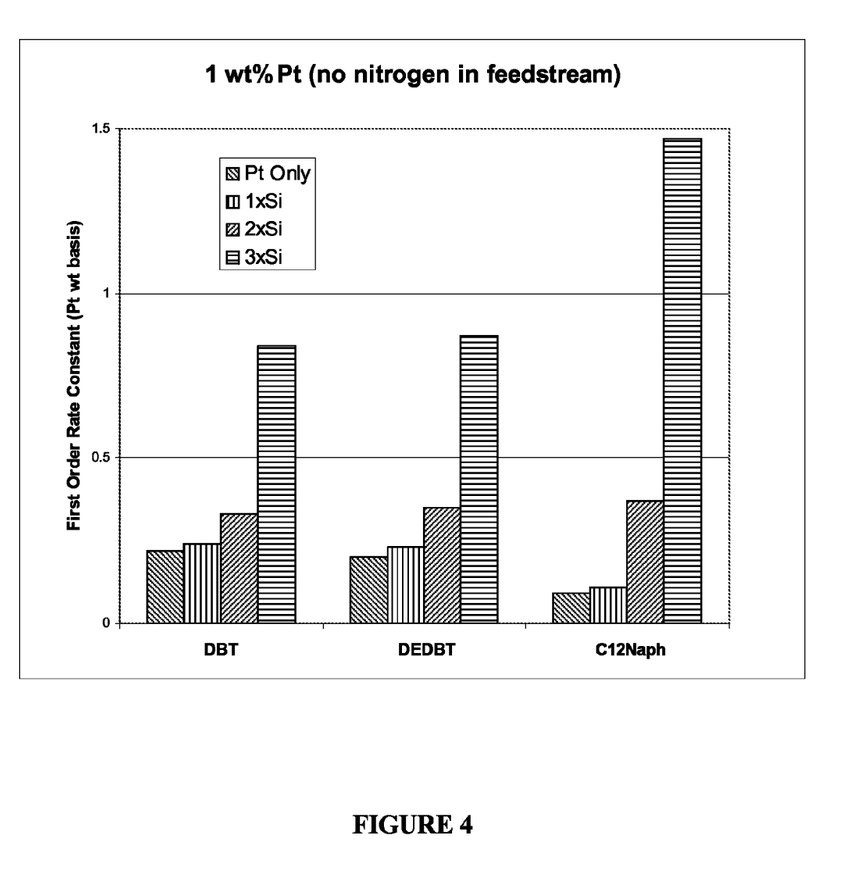
FIG. 4 is a graph depicting first order rate constants for the conversion of dibenzothiophene (DBT), diethyldibenzothiophene (DEDBT) and 1n-dodecylnaphthalenes ($C_{12}$ naph) in model feeds, in the presence of a platinum hydroprocessing catalyst on an alumina support, with and without a coating of phenyl methyl polysiloxane.

FIG. 4 illustrates the results of the reaction of 1% $Pt/Al_2O_3$ with model feeds without acridine and is based on the data from Table 2. HiP results revealed that samples of $SiO_2$ coated 1% $Pt/Al_2O_3$ are more active than the parent sample of 1% $Pt/Al_2O_3$. It is possible that the acidity generated by $SiO_2$ coating on $Al_2O_3$ promotes HDS activities of DBT, DEDBT and hydrogenation activity of $C_{12}$ naphthalene, via other reaction pathways, such as cracking and isomerization. Pt metal function was partially preserved by silica coating despite in the presence of 1% S in the feed and 10% $H_2S/H_2$ during catalyst sulfidation, even though chemisorption data showed $SiO_2$ coating reduces Pt sites substantially, about 80-90%.

TABLE 2

Platinum weight based first order rate constants for the disappearance of compounds from model feeds using siloxane-coated 1% $Pt/Al_2O_3$ catalysts.

|  | DBT | DEDBT | C12 Naph |
|---|---|---|---|
| Pt Only | 0.22 | 0.20 | 0.09 |
| 1xSi | 0.24 | 0.23 | 0.11 |
| 2xSi | 0.33 | 0.35 | 0.37 |
| 3xSi | 0.84 | 0.87 | 1.47 |

Figure 5:
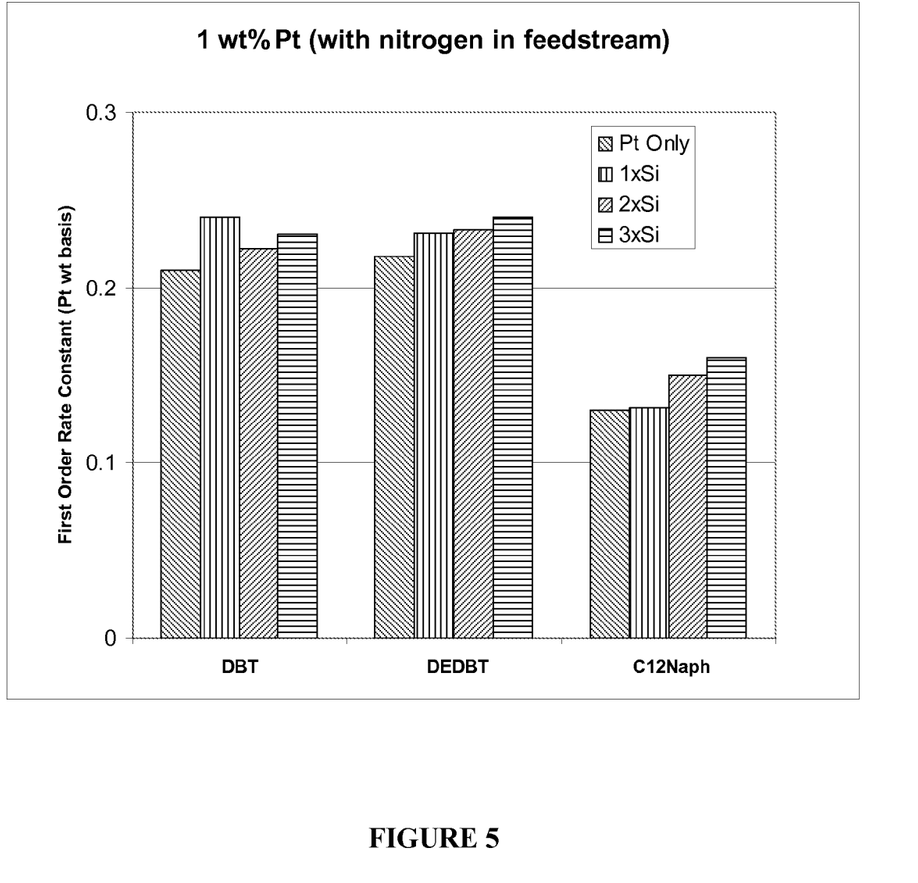
FIG. 5 is a graph depicting first order rate constants for the conversion of dibenzothiophene (DBT), diethyldibenzothiophene (DEDBT) and 1n-dodecylnaphthalenes ($C_{12}$ naph) in model feeds containing acridine, in the presence of a platinum hydroprocessing catalyst on an alumina support, with and without a coating of phenyl methyl polysiloxane.

Results for model feeds additionally containing 0.1 wt % acridine are shown in Table 3 and corresponding graphical depiction of the data in FIG. 5.

Addition of acridine, a nitrogen-containing catalyst poison, leads to a reduction in catalytic activity of the platinum metal function of the catalysts. Under these conditions, samples of $SiO_2$ coated 1% $Pt/Al_2O_3$ are more active than the parent sample of 1% $Pt/Al_2O_3$, on a total platinum weight basis. It should be noted that on an available platinum basis they are even more active when the reduction of active platinum available for reaction is factored (i.e., see data in Table 1 and preceding paragraph).

TABLE 3

Platinum weight based first order rate constants for the disappearance of compounds from model feeds containing acridine using siloxane-coated 1% $Pt/Al_2O_3$ catalysts.

|  | DBT | DEDBT | C12 Naph |
|---|---|---|---|
| Pt Only | 0.21 | 0.22 | 0.13 |
| 1xSi | 0.24 | 0.23 | 0.13 |
| 2xSi | 0.22 | 0.23 | 0.15 |
| 3xSi | 0.23 | 0.24 | 0.16 |

$ZrV_2$/CAB-O-SIL® Samples

Figure 6:
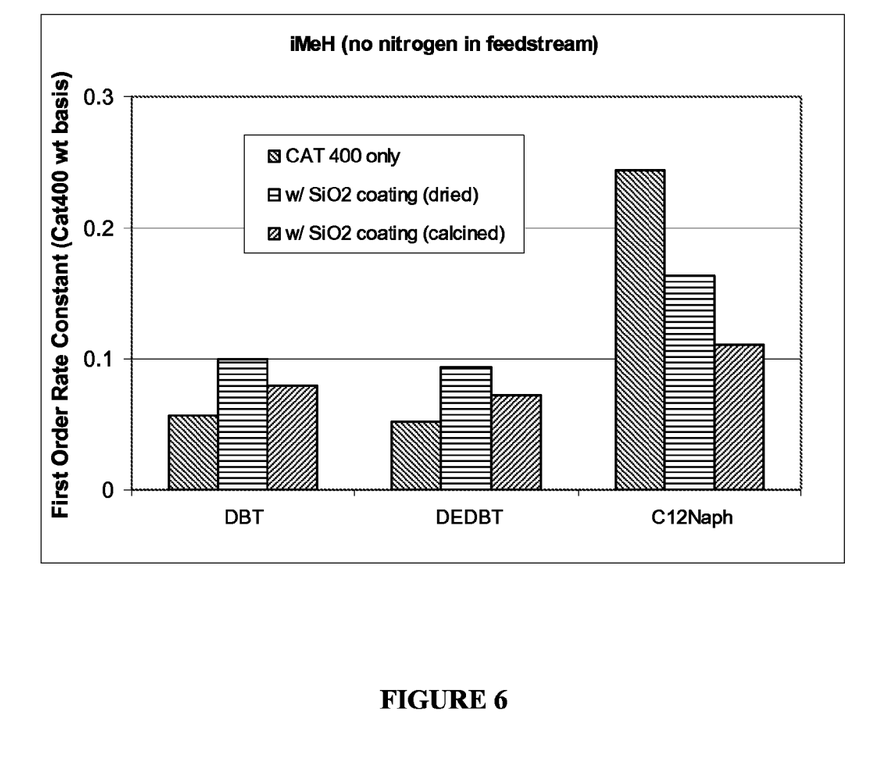
FIG. 6 is a graph depicting first order rate constants for the conversion of dibenzothiophene (DBT), diethyldibenzothiophene (DEDBT) and 1n-dodecylnaphthalenes ($C_{12}$ naph) in model feeds, in the presence of a $ZrV_2$ iMeH hydroprocessing catalyst, with and without a coating of CAB-O-SIL®.

FIG. 6 and Table 4 show the hydrodesulfurization (HDS) activities of DBT and DEDBT, and hydrogenation activities of $C_{12}$ naphthalene on 25% CAB-O-SIL®/$ZrV_2$ samples. The model feed used in FIG. 6 contained no nitrogen compounds. HiP results revealed that that 25% $SiO_2$ coating on $ZrV_2$ samples, both dried and calcined, have higher HDS activities as compared to uncoated parent $ZrV_2$ iMeH, but slightly lower hydrogenation activities.

TABLE 4

$ZrV_2$ weight based first order rate constants for the disappearance of compounds from model feeds using CAB-O-SIL ® coated Cat400 catalysts.

| | Cat 400 | +/− | w/CAB-O-SIL ®, dried | +/− | w/CAB-O-SIL ®, calcined | +/− |
|---|---|---|---|---|---|---|
| DBT | 0.057 | 0.039 | 0.100 | 0.012 | 0.080 | 0.050 |
| DEDBT | 0.052 | 0.037 | 0.094 | 0.007 | 0.073 | 0.020 |
| C12Naph | 0.244 | 0.119 | 0.164 | 0.014 | 0.111 | 0.010 |

Figure 7:
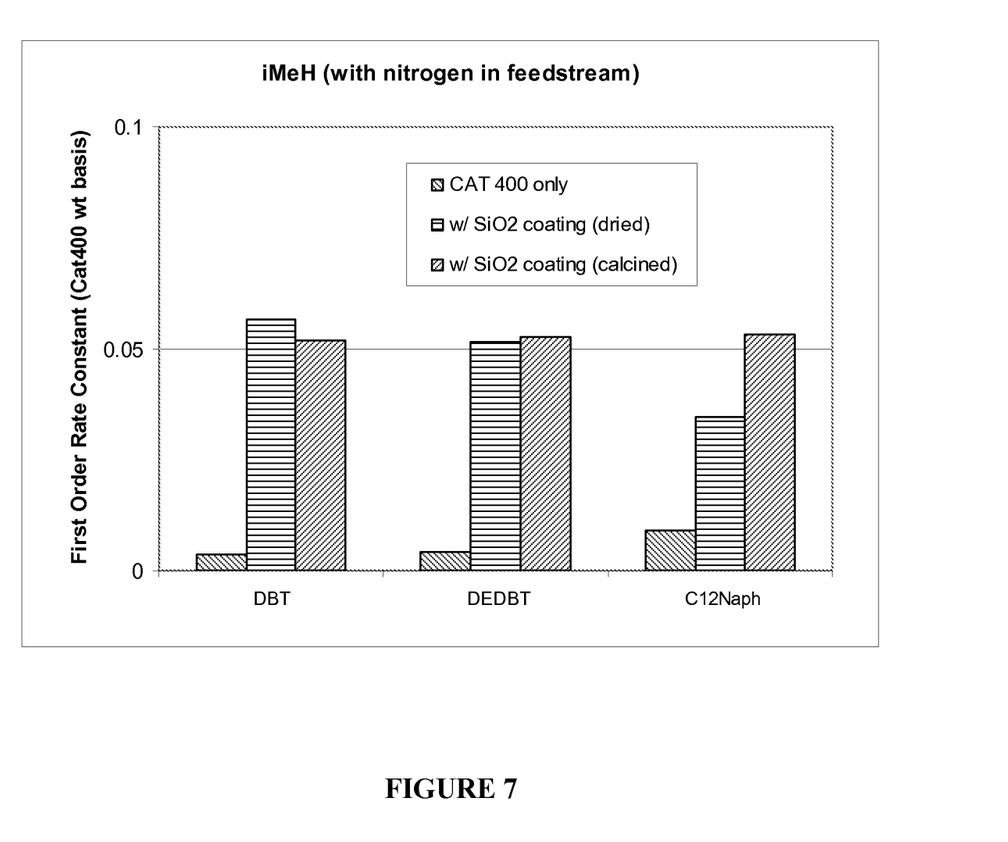
FIG. 7 is a graph depicting first order rate constants for the conversion of dibenzothiophene (DBT), diethyldibenzothiophene (DEDBT) and 1n-dodecylnaphthalenes ($C_{12}$ naph) in model feeds containing acridine, in the presence of a $ZrV_2$ iMeH hydroprocessing catalyst, with and without a coating of CAB-O-SIL®.

Results for model feeds additionally containing 0.1 wt % acridine are shown in FIG. 7 and Table 5. Bulk uncoated $ZrV_2$ catalyst experienced severe deactivation due to N poison. However, CAB-O-SIL® $SiO_2$ coated $ZrV_2$ samples, both dried and calcined, showed less deactivation upon addition of acridine in the model feed.

TABLE 5

$ZrV_2$ weight based first order rate constants for the disappearance of compounds from model feeds containing acridine, using CAB-O-SIL ® coated Cat400 catalysts.

| | Cat 400 | +/− | w/CAB-O-SIL ®, dried | +/− | w/CAB-O-SIL ®, calcined | +/− |
|---|---|---|---|---|---|---|
| DBT | 0.004 | 0.002 | 0.057 | 0.024 | 0.052 | 0.011 |
| DEDBT | 0.004 | 0.002 | 0.052 | 0.026 | 0.053 | 0.012 |
| C12Naph | 0.009 | 0.003 | 0.035 | 0.011 | 0.053 | 0.013 |

As can be seen from this example and in the results shown in Table 5, the CAB-O-SIL® coated Cat400 catalysts experienced an approximate 10× activity increase (DBT & DEDBT) over the uncoated Cat400 catalysts when in the presence of organic nitrogen poisons (e.g., acridine). The CAB-O-SIL® coated Cat400 catalysts also experienced an approximate 3 to 5× activity increase in hydrogenation activity ($C_{12}$ naphthalene) over the uncoated Cat400 catalysts in the presence of organic nitrogen poisons.

All patents, publications and references cited herein are hereby fully incorporated by reference. In case of conflict between the present disclosure and incorporated patents, publications and references, the present disclosure should control.

What is claimed is:

1. A catalyst for the hydroprocessing of hydrocarbon-containing feedstreams containing organic nitrogen and organic sulfur compounds, such catalyst having a surface and comprising:
   an active catalyst component comprising Mo, W, Co, Ni, Pd, Pt or an interstitial metal hydride
   a metal oxide film that is permeable to hydrogen and which partially restricts access of organic nitrogen and organic sulfur components in the feedstream to the coated active catalyst, the film being selectively coated onto the active catalyst component but on less than all of the surface of the active catalyst component.

2. The catalyst of claim 1, wherein the active catalyst component is an interstitial metal hydride.

3. The catalyst of claim 2, wherein the interstitial metal hydride has a compositional formula of A1-xMxT5-y-zByCz, wherein:
   A=Mm [mischmetal]; T=Ni; M=La, Pr, Nd or Ce; B=Co; C=Mn, Al or Cr; and
   x=0.0 to 1.0; y =0.0 to 2.5; and z =0.0 to 0.5.

4. The catalyst of claim 2, wherein the interstitial metal hydride has a compositional formula of A2-xMxT14-yCy-DzB, wherein:
   A=Nd or Pr; T=Fe; M =La, Pr, Nd or Ce; B =Boron; C =Co; D =Cr, Ni or Mn; and
   x=0.0 to 2.0; y =0.0 to 14; and z =0.0 to 3.0.

5. The catalyst of claim 2, wherein the interstitial metal hydride has a compositional formula of A2-xMxT1-yBy, wherein:
   A =Mg; T =Ni or Cu; M =La; B =Fe or Co; and
   x=0.0 to 0.5; and y =0.0 to 0.5.

6. The catalyst of claim 2, wherein the interstitial metal hydride has a compositional formula of A1-xBxT[2-y]+d1Cy+d2, wherein:
   A =Nd or Zr; B=at least one of La, Ce, Pr, Gd, Tb, Dy, Er, Ho, Ti and Hf; T =at least one of Fe and V; C =at least one of Cr, Mn, Fe, Co, Ni and Cu;
   x=0.0 to 1.0; and y =0.0 to 2.0; and
   d1=0.00 to 0.2; and d2=0.00 to 0.2.

7. The catalyst of claim 1, wherein the metal oxide film comprises alumina, silica, titania, zirconia, or a combination thereof.

8. The catalyst of claim 1, wherein the wt % of the metal oxide film is at least 5 wt % of the active catalyst component that is coated.

9. A method of making a catalyst for the hydroprocessing of hydrocarbon-containing feedstreams, such method comprising:
   a) selectively depositing a metal oxide film on the surface of an active catalyst component comprising at least one transition metal selected from Mo, W, Co, Ni, Pd or Pt or an interstitial metal hydride, the coating being applied selectively to cover less than all of the surface;
   b) drying the metal oxide film of step a) in an inert atmosphere; and
   c) calcining the dried metal oxide film of step b) to produce a catalyst for the hydroprocessing of hydrocarbon-containing feedstreams.

10. The method of claim 9, wherein the active catalyst component is an interstitial metal hydride.

11. The method of claim 9, wherein the wt % of the metal oxide film is at least 5 wt % of the active catalyst component.

* * * * *